(12) United States Patent
Haraguchi et al.

(10) Patent No.: US 9,562,170 B2
(45) Date of Patent: Feb. 7, 2017

(54) CURABLE COMPOSITION INCLUDING FLUORINE-CONTAINING HIGHLY BRANCHED POLYMER AND SILOXANE OLIGOMER

(71) Applicant: NISSAN CHEMICAL INDUSTRIES, LTD., Tokyo (JP)

(72) Inventors: Masayuki Haraguchi, Funabashi (JP); Hiroyasu Tamura, Funabashi (JP)

(73) Assignee: NISSAN CHEMICAL INDUSTRIES, LTD., Tokyo (JP)

( * ) Notice: Subject to any disclaimer, the term of this patent is extended or adjusted under 35 U.S.C. 154(b) by 80 days.

(21) Appl. No.: 14/440,385

(22) PCT Filed: Nov. 1, 2013

(86) PCT No.: PCT/JP2013/079739
§ 371 (c)(1),
(2) Date: Jun. 26, 2015

(87) PCT Pub. No.: WO2014/069634
PCT Pub. Date: May 8, 2014

(65) Prior Publication Data
US 2015/0337161 A1    Nov. 26, 2015

(30) Foreign Application Priority Data

Nov. 5, 2012 (JP) ................................ 2012-243965

(51) Int. Cl.
| | |
|---|---|
| C08L 83/04 | (2006.01) |
| B32B 17/10 | (2006.01) |
| C09D 151/00 | (2006.01) |
| C03C 17/30 | (2006.01) |
| C09D 4/00 | (2006.01) |
| C09D 7/12 | (2006.01) |
| C08F 290/06 | (2006.01) |
| C08F 299/08 | (2006.01) |
| C09D 4/06 | (2006.01) |
| C09D 183/02 | (2006.01) |
| C09D 183/04 | (2006.01) |
| C09D 183/10 | (2006.01) |
| C08F 30/08 | (2006.01) |
| C08F 230/08 | (2006.01) |
| C08G 77/20 | (2006.01) |
| C08G 77/442 | (2006.01) |

(52) U.S. Cl.
CPC ............ *C09D 151/003* (2013.01); *C03C 17/30* (2013.01); *C08F 290/06* (2013.01); *C08F 299/08* (2013.01); *C08L 83/04* (2013.01); *C09D 4/00* (2013.01); *C09D 4/06* (2013.01); *C09D 7/12* (2013.01); *C09D 183/02* (2013.01); *C09D 183/04* (2013.01); *C09D 183/10* (2013.01); C03C 2217/76 (2013.01); C03C 2217/78 (2013.01); *C08F 30/08* (2013.01); *C08F 230/08* (2013.01); *C08G 77/20* (2013.01); *C08G 77/442* (2013.01); Y10T 428/264 (2015.01); Y10T 428/31612 (2015.04)

(58) Field of Classification Search
USPC ................. 428/429, 335; 528/25; 524/588
See application file for complete search history.

(56) References Cited

U.S. PATENT DOCUMENTS

2005/0245633 A1* 11/2005 Soutar ................. B41J 2/1606
522/83

FOREIGN PATENT DOCUMENTS

| JP | H02-269106 A | 11/1990 |
|---|---|---|
| JP | H08-245652 A | 9/1996 |
| JP | 2004-224906 A | 8/2004 |
| JP | 2004-285119 A | 10/2004 |
| WO | 2012/074071 A1 | 6/2012 |

OTHER PUBLICATIONS

English abstract of WO 2008126902, 4 pages, Oct. 23, 2008.*
English abstract of JP 2011116975, 3 pages, Jun. 16, 2011.*
English abstract of KR 2013003296, 4 pages, Jan. 9, 2013.*
Jan. 14, 2014 Written Opinion issued in International Patent Application No. PCT/JP2013/079739.

* cited by examiner

*Primary Examiner* — Tae H Yoon
(74) *Attorney, Agent, or Firm* — Oliff PLC

(57) ABSTRACT

A curable composition including: (a) 100 parts by mass of a siloxane oligomer containing at least one radically polymerizable double bond, (b) 0.001 to 1 part by mass of a fluorine-containing highly branched polymer, (c) 0.01 to 40 parts by mass of a surface modifier containing a perfluoropolyether compound, and (d) 0.1 to 25 parts by mass of a polymerization initiator generating a radical upon active energy ray irradiation, wherein the fluorine-containing highly branched polymer (b) is a fluorine-containing highly branched polymer obtained by polymerization of a monomer A containing two or more radically polymerizable double bonds per molecule and a monomer B containing a fluoroalkyl group and at least one radically polymerizable double bond per molecule in the presence of a polymerization initiator C in an amount of 5 to 200 mol % with respect to the number of moles of the monomer A.

21 Claims, 1 Drawing Sheet

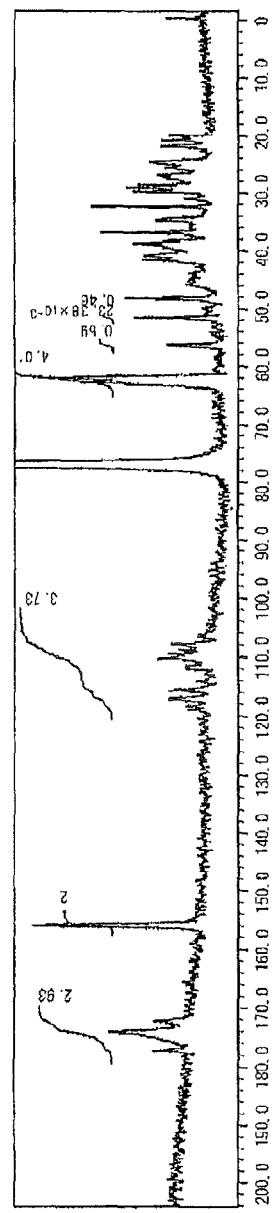

CURABLE COMPOSITION INCLUDING FLUORINE-CONTAINING HIGHLY BRANCHED POLYMER AND SILOXANE OLIGOMER

CROSS-REFERENCE TO RELATED APPLICATIONS

This application is the National Stage of International Application No. PCT/JP2013/079739, filed on Nov. 1, 2013, which claims the priority of Japanese Patent Application No. 2012-243965, filed on Nov. 5, 2012. The contents of both applications are hereby incorporated by reference in their entirety.

TECHNICAL FIELD

The present invention relates to a curable composition including a fluorine-containing highly branched polymer and a siloxane oligomer, a cured film obtained from the curable composition, a laminate including a hard coating layer obtained from the curable composition, and the siloxane oligomer and a method for producing the same.

BACKGROUND ART

In recent years, polymer (macro-molecule) materials have been increasingly utilized in a variety of fields. Accordingly, characteristics of their surfaces and interfaces have become important as well as their polymer characteristics as a matrix in each field. For example, it has been expected that using a fluorine-based compound having low surface energy as a surface modifying agent improves characteristics related to surface and interface control such as water repellency and oil repellency, antifoulingness, nonadhesiveness, peeling properties, mold releasability, slidability, wear resistance, anti-reflection characteristics, and chemical resistance, and various technologies have been developed.

Various displays such as LCDs (liquid crystal displays), PDPs (plasma displays), and touch panels have, on their surfaces, various plastic films that contain an anti-scratch hard coating layer. The hard coating layer is easily tainted with fingerprints and smudges adhering thereto, and the adhering fingerprints and smudges cannot be easily removed. This makes images on the display appear seriously blurred and adversely affects appearance of the display. In particular, a touch panel comes into direct contact with fingers on its surface and is therefore strongly desired to have properties, in particular, to prevent fingerprints from easily adhering to the surface and to easily remove the adhering fingerprints.

Regarding films that have such a hard coating layer, for the purpose of making the surface of the hard coating layer flat (level or smooth) and applying anti-smudge properties to the surface, a technique has been developed in which a hard coating layer is formed by adding a silicon compound and a fluorine compound to a hard coating layer-forming coating solution that contains an active energy ray-curable composition. These compounds have anti-fingerprint properties such as protection against fingerprint adhesion and fingerprint wiping-off properties as well as functions to improve smoothness and anti-smudge properties against permanent marker ink or the like.

For example, a hard coating layer-forming composition is described that includes a fluorine-containing highly branched polymer and a perfluoropolyether compound or a silicone compound so as to obtain excellent surface properties such as anti-fingerprint properties and excellent resistance to solvent wiping-off properties (Patent Document 1).

By the way, the surface of a display with a capacitive touch panel function, which is typified by the surface of a smartphone, is generally glass from functionality and design standpoints. The glass surface has anti-scratch properties, anti-fingerprint properties, and anti-smudge properties. To the glass surface, however, the active energy ray-curable composition as described above does not have adhesion because the active energy ray-curable composition shrinks to a great extent on curing and does not form a chemical bond with the glass surface. Because of this, the glass surface is provided with a film that includes a hard coating layer having anti-fingerprint properties and anti-smudge properties so as to apply these functions to the glass surface.

As a method for improving adhesion of a hard coating layer that includes an active energy ray-curable composition to the glass surface, a technique is described in which a reaction product of a hydroxy group-containing multifunctional acrylate and an alkoxysilane compound is used as a component to promote adhesion of a multifunctional acrylate to the glass (Patent Document 2).

PRIOR ART DOCUMENTS

Patent Documents

Patent Document 1: International Publication No. WO 2012/074071 Pamphlet
Patent Document 2: Japanese Patent Application Publication No. 2004-285119 (JP 2004-285119 A)

SUMMARY OF THE INVENTION

Problem to be Solved by the Invention

Although a cured film obtained from the hard coating layer-forming composition described in Patent Document 1 has excellent surface properties such as anti-fingerprint properties, the cured film does not adequately adhere to a glass substrate and therefore needs further improvement so as to be used as a hard coating layer on the surface of a display of a smartphone or the like.

As described above, Patent Document 2 describes a method of adding a reaction product of a hydroxy group-containing multifunctional acrylate and an alkoxysilane compound serving as an adhesion-promoting component to a curable resin composition containing a thermal acid generator and a multifunctional acrylate. The multifunctional acrylate, however, does not adhere to glass and therefore adhesion of the resulting hard coating film to glass is inadequate. In addition, the reaction product is capable of undergoing condensation with a silanol group on a glass surface after being hydrolyzed with an acid catalyst. The resulting hydrolysis product, however, poorly disperses in the multifunctional acrylate, which may, on curing, cause white turbidity appearing on a glass substrate to reduce transparency. Further, a three-dimensional cured film obtained by UV curing of the multifunctional acrylate has excellent resistance to scratches when it has a thickness of 1 μm or greater, which is common thickness. When the film thickness is 100 nm or smaller, for example, its characteristics as bulk are not exhibited and resistance to scratches is not obtained. In other words, the thin hard coating formed when cured with UV has a problem in its resistance to scratches.

Means for Solving the Problem

The inventors of the present invention conducted intensive research to solve these problems and, as a result, found that, by using a curable composition that includes a product obtained through partial hydrolysis and condensation of an alkoxysilane containing a radically polymerizable double bond as a curable component, a fluorine-containing highly branched polymer as an anti-fingerprint and anti-smudge component, a surface modifier containing a perfluoropolyether, and a photopolymerization initiator, an anti-smudge hard coating that has excellent anti-fingerprint properties and excellent anti-smudge properties, exhibits excellent adhesion to glass, and has excellent resistance to scratches can be formed.

Thus, the present invention relates to, as a first aspect, a curable composition comprising:

(a) 100 parts by mass of a siloxane oligomer containing at least one radically polymerizable double bond, (b) 0.001 to 1 part by mass of a fluorine-containing highly branched polymer, (c) 0.01 to 40 parts by mass of a surface modifier containing a perfluoropolyether compound, and (d) 0.1 to 25 parts by mass of a polymerization initiator generating a radical upon active energy ray irradiation, in which the fluorine-containing highly branched polymer (b) is a fluorine-containing highly branched polymer obtained by polymerization of a monomer A containing two or more radically polymerizable double bonds per molecule and a monomer B containing a fluoroalkyl group and at least one radically polymerizable double bond per molecule in the presence of a polymerization initiator C in an amount of 5 to 200 mol % with respect to the number of moles of the monomer A.

The present invention relates to, as a second aspect, the curable composition according to the first aspect, in which the siloxane oligomer containing at least one radically polymerizable double bond (a) is a siloxane oligomer obtained through hydrolysis-condensation of an alkoxysilane D of Formula [3]:

$$R^3{}_a Si(OR^4)_{4-a} \quad [3]$$

(where $R^3$ is a monovalent organic group containing a radically polymerizable double bond, $R^4$ is a methyl group or an ethyl group, and a is 1 or 2).

The present invention relates to, as a third aspect, the curable composition according to the second aspect, in which $R^3$ is a monovalent organic group containing a vinyl group or a (meth)acrylic group.

The present invention relates to, as a fourth aspect, the curable composition according to the third aspect, in which the alkoxysilane D is a compound of Formula [4]:

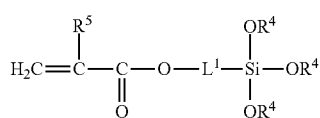
[4]

(where $R^4$ is the same as defined above for Formula [3], $R^5$ is a hydrogen atom or a methyl group, and $L^1$ is a $C_{1-6}$ alkylene group).

The present invention relates to, as a fifth aspect, the curable composition according to any one of the second aspect to the fourth aspect, in which the siloxane oligomer containing at least one radically polymerizable double bond (a) is a siloxane oligomer obtained through hydrolysis-condensation of the alkoxysilane D and an alkoxysilane E of Formula [5]:

$$R^6{}_b Si(OR^7)_{4-b} \quad [5]$$

(where $R^6$ is a $C_{1-6}$ alkyl group that is optionally substituted with a fluorine atom or a phenyl group, $R^7$ is a methyl group or an ethyl group, and b is an integer of 0 to 2).

The present invention relates to, as a sixth aspect, the curable composition according to the fifth aspect, in which the siloxane oligomer containing at least one radically polymerizable double bond (a) is a siloxane oligomer containing at least 10 mol % of the alkoxysilane D unit.

The present invention relates to, as a seventh aspect, the curable composition according to the first aspect, in which the siloxane oligomer containing at least one radically polymerizable double bond (a) is a siloxane oligomer containing a structural unit of Formula [6] in an amount of at least 10 mol % of all the structural units:

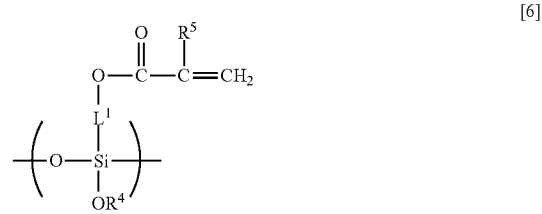
[6]

(where $L^1$ is a $C_{1-6}$ alkylene group, $R^4$ is a methyl group or an ethyl group, and $R^5$ is a hydrogen atom or a methyl group).

The present invention relates to, as an eighth aspect, the curable composition according to any one of the first aspect to the seventh aspect, in which the monomer A is a compound containing one or both of a vinyl group and a (meth)acrylic group.

The present invention relates to, as a ninth aspect, the curable composition according to the eighth aspect, in which the monomer A is a divinyl compound or a di(meth)acrylate compound.

The present invention relates to, as a tenth aspect, the curable composition according to any one of the first aspect to the ninth aspect, in which the monomer B is a compound containing at least either a vinyl group or a (meth)acrylic group.

The present invention relates to, as an eleventh aspect, the curable composition according to the tenth aspect, in which the monomer B is a compound of Formula [1]:

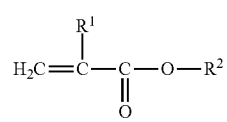
[1]

(where $R^1$ is a hydrogen atom or a methyl group and $R^2$ is a $C_{2-12}$ fluoroalkyl group that is optionally substituted with a hydroxy group).

The present invention relates to, as a twelfth aspect, the curable composition according to the eleventh aspect, in which the monomer B is a compound of Formula [2]:

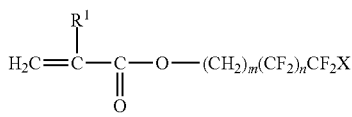

[2]

(where $R^1$ is the same as defined above for Formula [1], X is a hydrogen atom or a fluorine atom, m is 1 or 2, and n is an integer of 0 to 5).

The present invention relates to, as a thirteenth aspect, the curable composition according to any one of the first aspect to the twelfth aspect, in which the polymerization initiator C is an azo polymerization initiator.

The present invention relates to, as a fourteenth aspect, the curable composition according to any one of the first aspect to the thirteenth aspect, in which the fluorine-containing highly branched polymer (b) is a highly branched polymer obtained by using the monomer B in an amount of 5 to 300 mol % with respect to the monomer A.

The present invention relates to, as a fifteenth aspect, the curable composition according to any one of the first aspect to the fourteenth aspect, in which the polymerization initiator generating a radical upon active energy ray irradiation (d) is an alkylphenone compound.

The present invention relates to, as a sixteenth aspect, the curable composition according to any one of the first aspect to the fifteenth aspect, further comprising: as a hydrolysis catalyst, (e) an acid or an acid generator in an amount of 0.0001 to 10 mol % with respect to the alkoxysilyl group of the siloxane oligomer containing at least one radically polymerizable double bond (a).

The present invention relates to, as a seventeenth aspect, a cured film obtained from the curable composition as claimed in any one of the first aspect to the sixteenth aspect.

The present invention relates to, as an eighteenth aspect, a laminate comprising: a hard coating layer on at least part of a surface of a base material, in which the hard coating layer is obtained by applying the curable composition according to any one of the first aspect to the sixteenth aspect to the base material to form a coating and irradiating the coating with an active energy ray for curing.

The present invention relates to, as a nineteenth aspect, the laminate according to the eighteenth aspect, in which the laminate is obtained by performing an additional baking process.

The present invention relates to, as a twentieth aspect, the laminate according to the eighteenth aspect or the nineteenth aspect, in which the base material is glass.

The present invention relates to, as a twenty-first aspect, the laminate according to any one of the eighteenth aspect to the twentieth aspect, in which the hard coating layer has a thickness of 1 nm to 50 μm.

Effects of the Invention

The curable composition of the present invention includes, as its component, a particular fluorine-containing highly branched polymer. The particular fluorine-containing highly branched polymer has a branched structure that is intentionally introduced thereto, which makes the molecule less likely to be entangled with another molecule than in the case of a linear polymer molecule and therefore allows the polymer to behave in a like manner as a fine particle does. This allows the fluorine-containing highly branched polymer to readily segregate within a matrix resin to the surface, which tends to provide the surface of the resin with anti-smudge properties such as repellency to permanent marker ink and repellency to water and oil.

The curable composition of the present invention includes a surface modifier containing a perfluoropolyether compound, and therefore a cured film obtained from the composition can have anti-smudge properties such as repellency to permanent marker ink and can also have repellency to water and oil.

In particular, the curable composition of the present invention includes a siloxane oligomer containing a radically polymerizable double bond, and the siloxane oligomer includes a product obtained through partial hydrolysis and condensation of an alkoxysilane having an alkoxy group. The alkoxy group, when hydrolyzed by an action of an acid, is converted into a silanol group, which is active toward a hydroxy group on the surface of glass serving, for example, as a substrate. This allows a cured film and a coating layer obtained from the curable composition of the present invention to form a chemical bond with glass surface, which means that adhesion of the cured film and the coating layer to glass is likely to be achieved.

Besides, the curable coating composition of the present invention, when containing, as a polymerization initiator, a polymerization initiator generating a radical upon active energy ray irradiation, in particular a particular polymerization initiator, can form a cured film that has the surface activity described above upon ultraviolet irradiation under ordinary curing conditions, namely, in a nitrogen atmosphere or in an air atmosphere without requiring particular curing conditions such as electron beam irradiation in a nitrogen atmosphere.

BRIEF DESCRIPTION OF THE DRAWINGS

FIG. 1 is a graph illustrating a $^{13}$C NMR spectrum of F-HBP obtained in Synthesis Example 1.

MODES FOR CARRYING OUT THE INVENTION

<Curable Composition>

The curable composition of the present invention includes a siloxane oligomer containing at least one radically polymerizable double bond (a), a fluorine-containing highly branched polymer (b), a surface modifier containing a perfluoropolyether compound (c), and a polymerization initiator generating a radical upon active energy ray irradiation (d).

In the following, the components (a) to (d) are described in detail.

[(a) Siloxane Oligomer Containing at Least One Radically Polymerizable Double Bond]

The siloxane oligomer containing at least one radically polymerizable double bond (a) (hereinafter, simply referred to as a siloxane oligomer (a) as well) preferably contains an alkoxysilane D of Formula [3] as its essential alkoxysilane unit, and is desirably a siloxane oligomer that is obtained through hydrolysis-condensation of the alkoxysilane D:

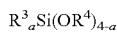 [3]

where $R^3$ is a monovalent organic group containing a radically polymerizable double bond, $R^4$ is a methyl group or an ethyl group, and a is 1 or 2.

The monovalent organic group containing a radically polymerizable double bond, as $R^3$, is preferably a monovalent organic group containing a vinyl group or a (meth)

acrylic group. In the present invention, a (meth)acrylic group refers to both an acrylic group and a methacrylic group.

The alkoxysilane D of Formula [3] is preferably a compound of Formula [4]:

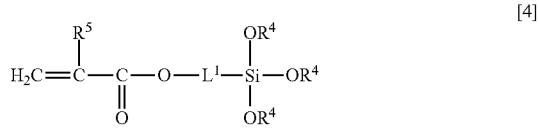

[4]

where $R^4$ is the same as defined above for Formula [3], $R^5$ is a hydrogen atom or a methyl group, and $L^1$ is a $C_{1-6}$ alkylene group.

Examples of the $C_{1-6}$ alkylene group as $L^1$ include a methylene group, an ethylene group, a trimethylene group, a methylethylene group, a tetramethylene group, a 1-methyltrimethylene group, a pentamethylene group, a 2,2-dimethyltrimethylene group, and a hexamethylene group.

Among these, a trimethylene group is preferable.

Specific examples of the alkoxysilane D include vinyltrimethoxysilane, vinyltriethoxysilane, 3-((meth)acryloyloxy)propyltrimethoxysilane, 3-((meth)acryloyloxy)propyltriethoxysilane, 3-((meth)acryloyloxy)propyl(methyl)dimethoxysilane, 3-((meth)acryloyloxy)propyl(methyl)diethoxysilane, 4-vinylphenyltrimethoxysilane, and 4-vinylphenyltriethoxysilane.

Among these, 3-((meth)acryloyloxy)propyltrimethoxysilane and 3-((meth)acryloyloxy)propyltriethoxysilane are preferable.

The siloxane oligomer (a) is preferably a siloxane oligomer obtained through hydrolysis-condensation of the alkoxysilane D and an alkoxysilane E of Formula [5]:

$$R^6{}_b Si(OR^7)_{4-b}$$ [5]

where $R^6$ is a $C_{1-6}$ alkyl group that is optionally substituted with a fluorine atom or a phenyl group, $R^7$ is a methyl group or an ethyl group, and b is an integer of 0 to 2.

Examples of the $C_{1-6}$ alkyl group that is optionally substituted with a fluorine atom, as $R^6$, include a methyl group, an ethyl group, an n-propyl group, an isopropyl group, an n-butyl group, an isobutyl group, a sec-butyl group, a tert-butyl group, an n-pentyl group, an isopentyl group, a neopentyl group, an n-hexyl group, and a cyclohexyl group.

Specific examples of the alkoxysilane E include tetramethoxysilane, tetraethoxysilane, methyltrimethoxysilane, methyltriethoxysilane, ethyltrimethoxysilane, ethyltriethoxysilane, propyltrimethoxysilane, propyltriethoxysilane, 3,3,3-trifluoropropyltrimethoxysilane, 3,3,3-trifluoropropyltriethoxysilane, butyltrimethoxysilane, butyltriethoxysilane, pentyltrimethoxysilane, pentyltriethoxysilane, hexyltrimethoxysilane, hexyltriethoxysilane, phenyltrimethoxysilane, phenyltriethoxysilane, dimethyldimethoxysilane, dimethyldiethoxysilane, diethyldimethoxysilane, diethyldiethoxysilane, dipropyldimethoxysilane, dipropyldiethoxysilane, dibutyldimethoxysilane, dibutyldiethoxysilane, dipentyldimethoxysilane, dipentyldiethoxysilane, dihexyldimethoxysilane, dihexyldiethoxysilane, diphenyldimethoxysilane, and diphenyldiethoxysilane.

Among these, tetramethoxysilane and tetraethoxysilane are preferable.

The siloxane oligomer (a) is preferably a siloxane oligomer containing the alkoxysilane D unit in an amount of at least 10 mol % of all the alkoxysilane units.

The siloxane oligomer (a) is particularly preferably a siloxane oligomer containing a structural unit of Formula [6] in an amount of at least 10 mol % of all the structural units:

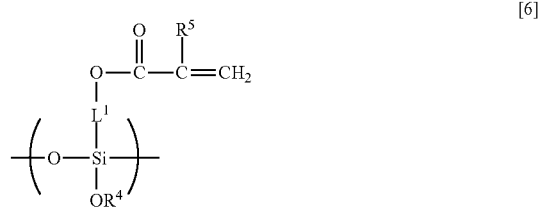

[6]

where each of $R^4$, $R^5$, and $L^1$ is the same as defined above for Formula [4].

The method for obtaining the siloxane oligomer (a) is not particularly limited.

The siloxane oligomer (a) is obtained, for example, through condensation of an alkoxysilane including the alkoxysilane D and, if desired, the alkoxysilane E, in an organic solvent. Examples of the method of polycondensation of the alkoxysilane include a method of hydrolysis-condensation of the alkoxysilane in a solvent such as an alcohol and a glycol. The hydrolysis-condensation reaction may be either partial hydrolysis or complete hydrolysis. When complete hydrolysis is adopted, the molar number of water to add may be theoretically 0.5 times the total molar number of alkoxy groups in the alkoxysilane, and usually the molar number of water to add is preferably greater than 0.5 times the total molar number of alkoxy groups in the alkoxysilane. In the present invention, the molar number of water to use for the reaction can be determined as desired, and usually the molar number of water to use for the reaction is preferably 0.5 to 2.5 times the total molar number of alkoxy groups in the alkoxysilane.

In addition, for the purpose of promoting the hydrolysis-condensation reaction, a catalyst is usually used, such as organic acids, for example, formic acid, acetic acid, propionic acid, butanoic acid, pentanoic acid, hexanoic acid, 2-ethylhexanoic acid, heptanoic acid, octanoic acid, nonanoic acid, decanoic acid, stearic acid, oleic acid, linoleic acid, linolenic acid, arachidonic acid, oxalic acid, malonic acid, methylmalonic acid, succinic acid, tartaric acid, maleic acid, fumaric acid, adipic acid, sebacic acid, citric acid, monochloroacetic acid, dichloroacetic acid, trichloroacetic acid, trifluoroacetic acid, benzoic acid, p-aminobenzoic acid, salicylic acid, gallic acid, phthalic acid, mellitic acid, benzenesulfonic acid, and p-toluenesulfonic acid; inorganic acids, for example, hydrochloric acid, nitric acid, sulfuric acid, hydrofluoric acid, and phosphoric acid, and metal salts thereof; and alkalis, for example, ammonia, methylamine, ethylamine, ethanolamine, and triethylamine. Generally, the hydrolysis-condensation reaction is further promoted by heating the solution in which alkoxysilane is dissolved. The heating temperature and the heating time can be determined as desired. For example, heating at 50° C. for 24 hours with stirring or heating for 1 hour with stirring under reflux is adopted.

An alternative method is, for example, heating a mixture of the alkoxysilane, a solvent, and oxalic acid to perform polycondensation. Specifically, this process is performed by adding oxalic acid to an alcohol to obtain a solution of oxalic acid in alcohol and then mixing the alkoxysilane into the resulting solution that is being heated. The amount of oxalic acid to add is preferably 0.2 to 2 mol relative to 1 mol of all the alkoxy groups in the alkoxysilane. Heating in this method can be performed at a liquid temperature of 50 to 180° C. This method is preferably performed while the resulting solution is heated for several tens minutes to several tens hours under reflux so that evaporation, volatilization, and the like of the liquid do not occur.

The weight average molecular weight (Mw) of the siloxane oligomer (a) contained in the curable composition of the present invention measured by gel permeation chromatography in terms of polystyrene is 100 to 10,000 and preferably 500 to 5,000.

[(b) Fluorine-Containing Highly Branched Polymer]

The fluorine-containing highly branched polymer (b) is a polymer obtained by polymerizing a monomer A containing two or more radically polymerizable double bonds per molecule and a monomer B containing a fluoroalkyl group and at least one radically polymerizable double bond per molecule in the presence of a polymerization initiator C in an amount of 5 to 200 mol % with respect to the number of moles of the monomer A.

The fluorine-containing highly branched polymer (b) may also be obtained by copolymerizing other monomers that are different from the monomer A and the monomer B as long as the effects of the present invention are not impaired, The fluorine-containing highly branched polymer (b) is what is called an initiator-fragment incorporation radical polymerization (IFIRP) fluorine-containing highly branched polymer and has, at its end, a fragment of the polymerization initiator C used for polymerization.

[Monomer A]

In the present invention, the monomer A having in the molecule two or more radically polymerizable double bonds preferably has at least one or both of a vinyl group and a (meth)acrylic group and is more preferably a divinyl compound or a di(meth)acrylate compound. In the present invention, the (meth)acrylate compound refers to both an acrylate compound and a methacrylate compound. For example, (meth)acrylic acid refers to acrylic acid and methacrylic acid.

Examples of the monomer A include organic compounds of (A1) to (A7) below.

(A1) Vinyl hydrocarbons:
(A1-1) Aliphatic vinyl hydrocarbons; isoprene, butadiene, 3-methyl-1,2-butadiene, 2,3-dimethyl-1,3-butadiene, 1,2-polybutadiene, pentadiene, hexadiene, and octadiene
(A1-2) Alicyclic vinyl hydrocarbons; cyclopentadiene, cyclohexadiene, cyclooctadiene, and norbornadiene
(A1-3) Aromatic vinyl hydrocarbons; divinylbenzene, divinyltoluene, divinylxylene, trivinylbenzene, divinylbiphenyl, divinylnaphthalene, divinylfluorene, divinylcarbazole, and divinylpyridine
(A2) Vinyl esters, allyl esters, vinyl ethers, allyl ethers, and vinyl ketones:
(A2-1) Vinyl esters; divinyl adipate, divinyl maleate, divinyl phthalate, divinyl isophthalate, divinyl itaconate, and vinyl (meth)acrylate:
(A2-2) Allyl esters; diallyl maleate, diallyl phthalate, diallyl isophthalate, diallyl adipate, and allyl(meth)acrylate
(A2-3) Vinyl ethers; divinyl ether, diethylene glycol divinyl ether, and triethylene glycol divinyl ether
(A2-4) Allyl ethers; diallyl ether, di(allyloxy)ethane, tri(allyloxy)ethane, tetra(allyloxy)ethane, tetra(allyloxy)propane, tetra(allyloxy)butane, and tetra(methallyloxy)ethane
(A2-5) Vinyl ketones; divinyl ketone and diallyl ketone
(A3) (Meth)acrylic esters:
ethylene glycol di(meth)acrylate, triethylene glycol di(meth)acrylate, propylene glycol di(meth)acrylate, neopentyl glycol di(meth)acrylate, trimethylolpropane tri(meth)acrylate, ditrimethylolpropane tetra(meth)acrylate, glycerol tri(meth)acrylate, pentaerythritol tetra(meth)acrylate, alkoxytitanium tri(meth)acrylate, 1,6-hexanediol di(meth)acrylate, 2-methyl-1,8-octanediol di(meth)acrylate, 1,9-nonanediol di(meth)acrylate, 1,10-decanediol di(meth)acrylate, tricyclo[5.2.1.0$^{2,6}$]decanedimethanol di(meth)acrylate, dioxane glycol di(meth)acrylate, 2-hydroxy-1-acryloyloxy-3-methacryloyloxypropane, 2-hydroxy-1,3-di(meth)acryloyloxypropane, 9,9-bis[4-(2-(meth)acryloyloxyethoxy)phenyl]fluorene, undecylenoxy ethylene glycol di(meth)acrylate, bis[4-(meth)acryloylthiophenyl]sulfide, bis[2-(meth)acryloylthioethyl]sulfide, 1,3-adamantanediol di(meth)acrylate, and 1,3-adamantanedimethanol di(meth)acrylate, aromatic urethane di(meth)acrylate, aliphatic urethane di(meth)acrylate (A4) Vinyl compounds having a poly(alkylene glycol) chain: poly(ethylene glycol) (molecular weight 300) di(meth)acrylate and poly(propylene glycol) (molecular weight 500) di(meth)acrylate (A5) Nitrogen-containing vinyl compounds:
diallylamine, diallyl isocyanurate, diallyl cyanurate, methylenebis(meth)acrylamide, and bismaleimide (A6) Silicon-containing vinyl compounds:
dimethyldivinylsilane, divinyl(methyl)(phenyl)silane, diphenyldivinylsilane, 1,3-divinyl-1,1,3,3-tetramethyldisilazane, 1,3-divinyl-1,1,3,3-tetraphenyldisilazane, and diethoxydivinylsilane (A7) Fluorine-containing vinyl compounds:
1,4-divinylperfluorobutane, 1,6-divinylperfluorohexane, and 1,8-divinylperfluorooctane Among these, aromatic vinyl hydrocarbons of the (A1-3) group, vinyl esters, allyl esters, vinyl ethers, allyl ethers, and vinyl ketones of the (A2) group, (meth)acrylic esters of the (A3) group, vinyl compounds having a poly(alkylene glycol) chain of the (A4) group, and nitrogen-containing vinyl compounds of the (A5) group are preferable. Particularly preferable are divinylbenzene belonging to the (A1-3) group; diallyl phthalate belonging to the (A2) group; ethylene glycol di(meth)acrylate, 1,3-adamantanedimethanol di(meth)acrylate, and tricyclo[5.2.1.0$^{2,6}$]decanedimethanol di(meth)acrylate, 2-hydroxy-1-acryloyloxy-3-methacryloyloxypropane, and aliphatic urethane di(meth)acrylate belonging to the (A3) group; and methylenebis(meth)acrylamide belonging to the (A5) group. Among these, ethylene glycol di(meth)acrylate and aliphatic urethane di(meth)acrylate are particularly preferable.

[Monomer B]

In the present invention, the monomer B having in the molecule a fluoroalkyl group and at least one radically polymerizable double bond preferably has at least either a vinyl group or a (meth)acrylic group, is preferably the compound of Formula [1], and is more preferably the compound of Formula [2].

Examples of the monomer B include 2,2,2-trifluoroethyl (meth)acrylate, 2,2,3,3,3-pentafluoropropyl(meth)acrylate, 2-(perfluorobutyl)ethyl (meth)acrylate, 2-(perfluorohexyl)ethyl (meth)acrylate, 2-(perfluorooctyl)ethyl (meth)acrylate, 2-(perfluorodecyl)ethyl (meth)acrylate, 2-(perfluoro-3-methylbutyl)ethyl (meth)acrylate, 2-(perfluoro-5-methylhexyl)ethyl (meth)acrylate, 2-(perfluoro-7-methyloctyl)ethyl (meth)acrylate, 2,2,3,3-tetrafluoropropyl(meth)acrylate, 1H,1H,5H-octafluoropentyl(meth)acrylate, 1H,1H,7H-dodecafluoroheptyl(meth)acrylate, 1H,1H,9H-hexadecafluorononyl(meth)acrylate, 1H-1-(trifluoromethyl)trifluoroethyl(meth)acrylate, 1H,1H,3H-hexafluorobutyl (meth)acrylate, 3-perfluorobutyl-2-hydroxypropyl(meth)

acrylate, 3-perfluorohexyl-2-hydroxypropyl(meth)acrylate, 3-perfluorooctyl-2-hydroxypropyl(meth)acrylate, 3-(perfluoro-3-methylbutyl)-2-hydroxypropyl(meth)acrylate, 3-(perfluoro-5-methylhexyl)-2-hydroxypropyl(meth)acrylate, and 3-(perfluoro-7-methyloctyl)-2-hydroxypropyl (meth)acrylate.

In the present invention, in view of reactivity and a surface modification effect, the amount of the monomer B used is 5 to 300 mol %, particularly 10 to 150 mol %, and more preferably 20 to 100 mol % with respect to the number of moles of the monomer A used.

[Other Monomers]

In the present invention, other monomers that are different from the monomer A and the monomer B are not particularly limited as long as these are monomers containing one radically polymerizable double bond per molecule and are preferably a vinyl compound or a (meth)acrylate compound.

In the present invention, the amount of other monomers is preferably 5 to 300 mol % relative to the molar number of the monomer A used.

[Polymerization Initiator C]

The polymerization initiator C in the present invention is preferably an azo-based polymerization initiator. Examples of the azo-based polymerization initiator include compounds of (1) to (5) below.

(1) Azo Nitrile Compounds:
2,2'-azobisisobutyronitrile, 2,2'-azobis(2-methylbutyronitrile), 2,2'-azobis(2,4-dimethylvaleronitrile), 1,1'-azobis(1-cyclohexanecarbonitrile), 2,2'-azobis(4-methoxy-2,4-dimethylvaleronitrile), and 2-(carbamoylazo)isobutyronitrile (2) Azo Amide Compounds:
2,2'-azobis {2-methyl-N-[1,1-bis(hydroxymethyl)-2-hydroxyethyl]propionamide}, 2,2'-azobis {2-methyl-N-[2-(1-hydroxybutyl)]propionamide}, 2,2'-azobis[2-methyl-N-(2-hydroxyethyl)propionamide], 2,2'-azobis[N-(2-propenyl)-2-methylpropionamide], 2,2'-azobis(N-butyl-2-methylpropionamide), and 2,2'-azobis(N-cyclohexyl-2-methylpropionamide)

(3) Cyclic Azo Amidine Compounds:
2,2'-azobis[2-(2-imidazolin-2-yl)propane]dihydrochloride, 2,2'-azobis[2-(2-imidazolin-2-yl)propane]disulfate dihydrate, 2,2'-azobis[2-[1-(2-hydroxyethyl)-2-imidazolin-2-yl]propane]dihydrochloride, 2,2'-azobis[2-(2-imidazolin-2-yl)propane], and 2,2'-azobis(1-imino-1-pyrrolidino-2-methylpropane)dihydrochloride (4) Azo Amidine Compounds:
2,2'-azobis(2-methylpropionamidine)dihydrochloride and 2,2'-azobis[N-(2-carboxyethyl)-2-methylpropionamidine] tetrahydrate (5) Others:
dimethyl 2,2'-azobisisobutyrate, 4,4'-azobis(4-cyanovaleric acid), 2,2'-azobis(2,4,4-trimethylpentane), 1,1'-azobis(1-acetoxy-1-phenylethane), dimethyl 1,1'-azobis(1-cyclohexanecarboxylate), bis(2-(perfluoromethyl)ethyl)4,4'-azobis(4-cyanovalerate), bis(2-(perfluorobutyl)ethyl) 4,4'-azobis(4-cyanovalerate), and bis(2-(perfluorohexyl)ethyl)4,4'-azobis (4-cyanovalerate)

Among these azo polymerization initiators, from the viewpoint of dispersibility of the resulting highly branched polymer in the component (a) and/or the component (c) and from the viewpoint of surface modification, 2,2'-azobis(2-methylbutyronitrile) or dimethyl 2,2'-azobisisobutyrate is preferable and dimethyl 2,2'-azobisisobutyrate is particularly preferable.

The polymerization initiator C is used in an amount of 5 to 200 mol %, preferably 20 to 200 mol %, and more preferably 20 to 150 mol % with respect to the number of moles of the monomer A.

[Method for Producing Fluorine-Containing Highly Branched Polymer]

The fluorine-containing highly branched polymer (b) is obtained by polymerizing the monomer A and the monomer B in the presence of the polymerization initiator C in a predetermined amount relative to the monomer A. Examples of the polymerization method include known methods such as solution polymerization, dispersion polymerization, precipitation polymerization, and bulk polymerization, and among these, solution polymerization or precipitation polymerization is preferable. In view of molecular weight control in particular, it is preferable to cause a reaction through solution polymerization in an organic solvent.

Examples of the organic solvent used in the polymerization include aromatic hydrocarbons such as benzene, toluene, xylene, ethyl benzene, and tetralin; aliphatic or alicyclic hydrocarbons such as n-hexane, n-heptane, mineral spirit, and cyclohexane; halogenides such as methyl chloride, methyl bromide, methyl iodide, methylene dichloride, chloroform, carbon tetrachloride, trichloroethylene, perchloroethylene, and o-dichlorobenzene; esters or ester ethers such as ethyl acetate, butyl acetate, methoxybutyl acetate, methylcellosolve acetate, ethylcellosolve acetate, and propylene glycol monomethyl ether acetate (PGMEA); ethers such as diethyl ether, tetrahydrofuran (THF), 1,4-dioxane, methylcellosolve, ethylcellosolve, butylcellosolve, and propylene glycol monomethyl ether (PGME); ketones such as acetone, methyl ethyl ketone (MEK), methyl isobutyl ketone (MIBK), di-n-butyl ketone, and cyclohexanone; alcohols such as methanol, ethanol, n-propanol, isopropanol, n-butanol, isobutanol, tert-butanol, 2-ethylhexyl alcohol, benzyl alcohol, and ethylene glycol; amides such as N,N-dimethylformamide (DMF), N,N-dimethylacetamide, and N-methyl-2-pyrrolidone (NMP); sulfoxides such as dimethyl sulfoxide (DMSO). These organic solvents may be used singly or two or more of them may be used in combination.

Among these, preferable are aromatic hydrocarbons, halogenides, esters, ethers, ketones, alcohols, and amides, and particularly preferable are benzene, toluene, xylene, ortho dichloro benzene, ethyl acetate, butyl acetate, propylene glycol monomethyl ether acetate (PGMEA), propylene glycol monomethyl ether (PGME), tetrahydrofuran (THF), 1,4-dioxane, methyl ethyl ketone (MEK), methyl isobutyl ketone (MIBK), methanol, ethanol, n-propanol, isopropanol, n-butanol, isobutanol, tert-butanol, N,N-dimethylformamide (DMF), N,N-dimethylacetamide, and N-methyl-2-pyrrolidone (NMP).

When the polymerization reaction is performed in the presence of an organic solvent, the mass of the organic solvent with respect to 1 part by mass of the monomer A is generally 5 to 120 parts by mass and preferably 10 to 110 parts by mass.

The polymerization reaction is performed at a normal pressure under pressure with being hermetically sealed or under a reduced pressure and is preferably performed at a normal pressure because of simplicity of apparatus and operation. It is also preferable to perform the reaction in an inert gas atmosphere such as $N_2$.

The polymerization temperature may be any temperature below the boiling point of a reaction mixture. In view of polymerization efficiency and molecular weight adjustment, the polymerization temperature is preferably 50° C. to 200° C., more preferably 80° C. to 150° C., and further preferably 80° C. to 130° C.

The reaction time cannot be determined unconditionally, because it varies by the reaction temperature, the types and ratios of the monomer A, the monomer B, the polymerization initiator C, the type of the polymerization solvent, or the like. The reaction time is preferably 30 to 720 minutes and more preferably 40 to 540 minutes.

After the termination of the polymerization reaction, the obtained fluorine-containing highly branched polymer is recovered by a certain method and is subjected to a post-treatment such as washing as needed. Examples of the method for recovering the polymer from the reaction solution include reprecipitation.

The weight average molecular weight (Mw) of the fluorine-containing highly branched polymer (b) measured by gel permeation chromatography in terms of polystyrene is 1,000 to 400,000 and preferably 2,000 to 200,000.

In the curable composition of the present invention, the amount of the fluorine-containing highly branched polymer (b) is 0.001 to 1 part by mass, preferably 0.005 to 1 part by mass, and particularly preferably 0.005 to 0.5 part by mass relative to 100 parts by mass of the siloxane oligomer containing at least one radically polymerizable double bond (a).

[(c) Surface Modifier Containing Perfluoropolyether Compound]

From the viewpoint of dispersibility in the siloxane oligomer containing at least one radically polymerizable double bond (a), the surface modifier containing a perfluoropolyether compound (c) is preferably a perfluoropolyether compound having one or both of its ends modified with an organic group and is particularly preferably a perfluoropolyether compound containing a (meth)acryloyl group.

From the viewpoint of dispersibility in the siloxane oligomer containing at least one radically polymerizable double bond (a) and from the viewpoint of the surface modifying effect, a perfluoropolyether compound having one end modified with an organic group and a perfluoropolyether compound having both ends modified with organic groups are preferably used in combination.

Specific examples of the surface modifier (c) used in the present invention is preferably a compound containing a repeating structure —(O—CF$_2$)—, —(O—CF$_2$CF$_2$)—, —(O—CF$_2$CF$_2$CF$_2$)—, or —(O—CF$_2$C(CF$_3$)F)— as a perfluoropolyether compound, and examples of the compound containing such a repeating structure include the following.

Compounds having both ends modified with alcohol: FOMBLIN (registered trademark) series ZDOL 2000, ZDOL 2500, ZDOL 4000, TX, and ZTETRAOL 2000GT, and FLUOROLINK (registered trademark) series D10H and E10H [all of them are manufactured by Solvay Specialty Polymers];

compounds having both ends modified with piperonyl groups: FOMBLIN (registered trademark) series AM2001 and AM3001 [both of them are manufactured by Solvay Specialty Polymers];

compounds having both ends modified with carboxylic acid: FLUOROLINK (registered trademark) C10 [manufactured by Solvay Specialty Polymers];

compounds having both ends modified with esters: FLUOROLINK (registered trademark) L10H [manufactured by Solvay Specialty Polymers];

compounds having both ends modified with (meth)acrylic groups: FLUOROLINK (registered trademark) series MD500, MD700, 5101X, and AD1700 [all of these are manufactured by Solvay Specialty Polymers], and CN4000 [manufactured by Sartomer]; and compounds having one end modified with a (meth)acrylic group: KY-1203 [manufactured by Shin-Etsu Chemical Co., Ltd.] and OPTOOL DAC-HP [manufactured by Daikin Industries, Ltd.].

Among these, compounds having both ends modified with (meth)acrylic groups and ones having one end modified with a (meth)acrylic group are preferable and FLUOROLINK (registered trademark) MD500, FLUOROLINK (registered trademark) MD700, FLUOROLINK (registered trademark) 5101X, FLUOROLINK (registered trademark) AD1700, and KY-1203 are particularly preferable.

In the curable composition of the present invention, the amount of the surface modifier (c) is 0.01 to 40 parts by mass, preferably 0.05 to 30 parts by mass, and particularly preferably 0.1 to 20 parts by mass relative to 100 parts by mass of the siloxane oligomer containing at least one radically polymerizable double bond (a).

[(d) Polymerization Initiator Generating Radical Upon Active Energy Ray Irradiation]

The polymerization initiator generating a radical upon active energy ray irradiation (d) is, for example, alkylphenones, benzophenones, ketals, anthraquinones, thioxanthones, azo compounds, peroxides, 2,3-dialkyldione compounds, disulfide compounds, thiuram compounds, or fluoroamine compounds. Among these, alkylphenones are preferable and α-hydroxyalkylphenones are particularly preferable. Specific examples thereof include 1-hydroxycyclohexyl phenyl ketone, 2-hydroxy-1-{4-[4-(2-hydroxy-2-methylpropionyl)benzyl]phenyl}-2-methylpropan-1-one, 2-methyl-1-[4-(methylthio)phenyl]-2-morpholinopropan-1-one, benzil dimethyl ketal, 1-(4-dodecylphenyl)-2-hydroxy-2-methylpropan-1-one, 2-hydroxy-2-methyl-1-phenylpropan-1-one, 1-(4-isopropylphenyl)-2-hydroxy-2-methylpropan-1-one, 2,2-dimethoxy-1,2-diphenylethan-1-one, 1-[4-(2-hydroxyethoxy)phenyl]-2-hydroxy-2-methyl-1-propan-1-one, 2-benzyl-2-dimethylamino-1-(4-morpholinophenyl)-1-butanone, 2-dimethylamino-2-[(4-methylphenyl)methyl]-1-[4-(4-morpholinyl)phenyl]-1-butanone, 2,4,6-trimethylbenzoyldiphenylphosphine oxide, bis(2,4,6-trimethylbenzoyl)(phenyl)phosphine oxide, 2-benzoyloxyimino-1-[4-(phenylthio)phenyl]octan-1-one, 1-{1-[9-ethyl-6-(2-methylbenzoyl)-9H-carbazol-3-yl] ethylideneaminooxy}ethanone, and benzophenone. Among these, 1-hydroxycyclohexyl phenyl ketone, 2-hydroxy-1-{4-[4-(2-hydroxy-2-methylpropionyl)benzyl]phenyl}-2-methylpropan-1-one, and 2-methyl-1-[4-(methylthio)phenyl]-2-morpholinopropan-1-one are preferable because they initiate and promote a polymerization reaction upon ionizing irradiation even at a small dose. These compounds can be used alone or as a combination of two or more of them, and are commercially available.

In the curable composition of the present invention, the amount of the polymerization initiator (d) is 0.1 to 25 parts by mass, preferably 0.1 to 20 parts by mass, and particularly preferably 1 to 20 parts by mass relative to 100 parts by mass of the siloxane oligomer containing at least one radically polymerizable double bond (a).

[(e) Acid or Acid Generator]

The curable composition of the present invention may further include an acid or an acid generator (e) as a hydrolysis catalyst.

Examples of the acid as a hydrolysis catalyst include organic acids and inorganic acids. Examples of the organic acids include formic acid, acetic acid, propionic acid, butanoic acid, pentanoic acid, hexanoic acid, 2-ethylhexanoic acid, heptanoic acid, octanoic acid, nonanoic acid, decanoic acid, stearic acid, oleic acid, linoleic acid, linolenic acid, arachidonic acid, oxalic acid, malonic acid, methylmalonic acid, succinic acid, tartaric acid, maleic acid, fumaric acid, adipic acid, sebacic acid, citric acid, monochloroacetic acid, dichloroacetic acid, trichloroacetic acid, trifluoroacetic acid, benzoic acid, p-aminobenzoic acid, salicylic acid, gallic acid, phthalic acid, mellitic acid, benzenesulfonic acid, and p-toluenesulfonic acid. Examples of the inorganic acids include hydrochloric acid, nitric acid, sulfuric acid, hydrofluoric acid, phosphoric acid, and metal salts thereof.

When an acid is used as the component (e), a quaternary ammonium salt or a quaternary phosphonium salt can be concurrently used to further promote condensation (sol-gel reaction) of alkoxysilyl groups derived from the siloxane oligomer and bonding of the alkoxysilyl groups to a base material described below.

Examples of the quaternary ammonium salt include tetramethylammonium hydroxide, tetramethylammonium fluoride, tetramethylammonium chloride, tetramethylammonium bromide, tetramethylammonium nitrate, tetramethylammonium sulfate, tetramethylammonium acetate, tetramethylammonium propionate, tetramethylammonium maleate, tetraethylammonium chloride, tetraethylammonium bromide, tetrapropylammonium chloride, tetrapropylammonium bromide, tetrabutylammonium hydroxide, tetrabutylammonium fluoride, tetrabutylammonium chloride, tetrabutylammonium bromide, benzyltrimethylammonium chloride, phenyltrimethylammonium chloride, benzyltriethylammonium chloride, methyltributylammonium chloride, benzyltributylammonium chloride, and methyltrioctylammonium chloride. Examples of the quaternary phosphonium salt include tetrabutylphosphonium bromide, ethyltriphenylphosphonium bromide, ethyltriphenylphosphonium iodide, butyltriphenylphosphonium bromide, and benzyltriphenylphosphonium chloride.

The acid generator, when used as the component (e), can be, for example, a thermal acid generator containing an onium salt such as an aromatic sulfonium salt, an aromatic iodonium salt, an aromatic diazonium salt, an aromatic ammonium salt, an η5-cyclopentadienyl-η6-cumenyl-Fe salt, or an aromatic phosphonium salt (examples of a counter anion of the onium salt include $BF_4^-$, $PF_6^-$, $AsF_6^-$, and $SbF_6^-$), an onium salt-containing photoacid generator such as bis(4-tert-butylphenyl)iodonium trifluoromethanesulfonate and triphenylsulfonium trifluoromethanesulfonate, a photoacid generator that contains a halogen-containing compound, such as 2-phenyl-4,6-bis(trichloromethyl)-1,3,5-triazine, or a sulfonic acid-containing photoacid generator such as benzoin tosylate and N-hydroxysuccinimide trifluoromethanesulfonate.

As the thermal acid generator, examples of the thermal acid generator containing an aromatic sulfonium salt include bis[4-(diphenylsulfonio)phenyl]sulfide bishexafluorophosphate, bis[4-(diphenylsulfonio)phenyl]sulfide bishexafluoroantimonate, bis[4-(diphenylsulfonio)phenyl]sulfide bistetrafluoroborate, bis[4-(diphenylsulfonio)phenyl]sulfide tetrakis(pentafluorophenyl)borate, (2-ethoxy-1-methyl-2-oxoethyl)(methyl)(2-naphthalenyl)sulfonium hexafluorophosphate, (2-ethoxy-1-methyl-2-oxoethyl)(methyl)(2-naphthalenyl)sulfonium hexafluoroantimonate, (2-ethoxy-1-methyl-2-oxoethyl)(methyl)(2-naphthalenyl)sulfonium tetrafluoroborate, (2-ethoxy-1-methyl-2-oxoethyl)(methyl)(2-naphthalenyl)sulfonium tetrakis(pentafluorophenyl)borate, diphenyl(4-(phenylthio)phenyl)sulfonium hexafluorophosphate, diphenyl(4-(phenylthio)phenyl)sulfonium hexafluoroantimonate, diphenyl(4-(phenylthio)phenyl)sulfonium tetrafluoroborate, diphenyl(4-(phenylthio)phenyl)sulfonium tetrakis(pentafluorophenyl)borate, triphenylsulfonium hexafluorophosphate, triphenylsulfonium hexafluoroantimonate, triphenylsulfonium tetrafluoroborate, triphenylsulfonium tetrakis(pentafluorophenyl)borate, bis[4-(di(4-(2-hydroxyethoxy)phenyl)sulfonio)phenyl]sulfide bishexafluorophosphate, bis[4-(di(4-(2-hydroxyethoxy)phenyl)sulfonio)phenyl]sulfide bishexafluoroantimonate, bis[4-(di(4-(2-hydroxyethoxy)phenyl)sulfonio)phenyl]sulfide bistetrafluoroborate, and bis[4-(di(4-(2-hydroxyethoxy)phenyl)sulfonio)phenyl]sulfide tetrakis(pentafluorophenyl)borate.

As the thermal acid generator, examples of the thermal acid generator containing an aromatic iodonium salt include diphenyliodonium hexafluorophosphate, diphenyliodonium hexafluoroantimonate, diphenyliodonium tetrafluoroborate, diphenyliodonium tetrakis(pentafluorophenyl)borate, bis(dodecylphenyl)iodonium hexafluorophosphate, bis(dodecylphenyl)iodonium hexafluoroantimonate, bis(dodecylphenyl)iodonium tetrafluoroborate, bis(dodecylphenyl)iodonium tetrakis(pentafluorophenyl)borate, (4-methylphenyl)(4-isopropylphenyl)iodonium hexafluorophosphate, (4-methylphenyl)(4-isopropylphenyl)iodonium hexafluoroantimonate, (4-methylphenyl)(4-isopropylphenyl)iodonium tetrafluoroborate, and (4-methylphenyl)(4-isopropylphenyl)iodonium tetrakis(pentafluorophenyl)borate.

As the thermal acid generator, examples of the thermal acid generator containing an aromatic diazonium salt include phenyldiazonium hexafluorophosphate, phenyldiazonium hexafluoroantimonate, phenyldiazonium tetrafluoroborate, and phenyldiazonium tetrakis(pentafluorophenyl)borate.

As the thermal acid generator, examples of the thermal acid generator containing an aromatic ammonium salt include 1-benzyl-2-cyanopyridinium hexafluorophosphate, 1-benzyl-2-cyanopyridinium hexafluoroantimonate, 1-benzyl-2-cyanopyridinium tetrafluoroborate, 1-benzyl-2-cyanopyridinium tetrakis(pentafluorophenyl)borate, 1-(naphthylmethyl)-2-cyanopyridinium hexafluorophosphate, 1-(naphthylmethyl)-2-cyanopyridinium hexafluoroantimonate, 1-(naphthylmethyl)-2-cyanopyridinium tetrafluoroborate, and 1-(naphthylmethyl)-2-cyanopyridinium tetrakis(pentafluorophenyl)borate.

As the thermal acid generator, examples of the thermal acid generator containing an η5-cyclopentadienyl-η6-cumenyl-Fe salt include η5-cyclopentadienyl-η6-cumenyl-Fe (II) hexafluorophosphate, η5-cyclopentadienyl-η6-cumenyl-Fe (II) hexafluoroantimonate, η5-cyclopentadienyl-η6-cumenyl-Fe (II) tetrafluoroborate, and η5-cyclopentadienyl-η6-cumenyl-Fe (II) tetrakis(pentafluorophenyl)borate.

As for these thermal acid generators, two or more different thermal acid generators may be used. Among these, it is particularly preferable to use as an anion a thermal acid generator having $SbF_6$— or $PF_6$— which promotes curing.

When the curable composition of the present invention includes the acid or acid generator (e), the amount of the acid or acid generator (e) is 0.0001 to 10 mol %, preferably 0.001 to 5 mol %, and particularly preferably 0.01 to 2 mol % per 1 mol of alkoxysilyl groups in the siloxane oligomer containing at least one radically polymerizable double bond (a).

When the acid is used as the component (e), and the quaternary ammonium salt or the quaternary phosphonium salt is concurrently used, the amount of the quaternary ammonium salt or the quaternary phosphonium salt added is 0.01 to 5 parts by mass relative to 100 parts by mass of the siloxane oligomer (a).

[(f) Silica Fine Particle]

The curable composition of the present invention may further include a silica fine particle (f).

The silica fine particle used herein preferably has an average particle diameter of 1 to 100 nm. When the average particle diameter exceeds 100 nm, a cured film formed by the curable composition prepared may have reduced transparency. The average particle diameter herein refers to an average particle diameter measured by dynamic light scattering (DLS).

The silica fine particle is preferably in the form of a colloidal solution, and the colloidal solution may be dispersion of a silica fine particle in a dispersion medium or may be a commercially available colloidal silica. In the present invention, by causing a silica fine particle to be included in the curable composition, the surface shape and other functions of the cured film to be formed can be imparted.

Examples of the dispersion medium for the silica fine particle include water and organic solvents, and particularly in the present invention, an organosilica sol dispersed in an organic solvent is preferably used.

Examples of the organic solvent as the dispersion medium include alcohols such as methanol, isopropanol, and butanol; glycols such as ethylene glycol, propyl cellosolve, propylene glycol monomethyl ether (PGME), and propylene glycol monomethyl ether acetate (PGMEA); ketones such as methyl ethyl ketone (MEK) and methyl isobutyl ketone (MIBK); aromatic hydrocarbons such as toluene and xylene; amides such as N,N-dimethylformamide (DMF), N,N-dimethylacetamide, and N-methyl-2-pyrrolidone (NMP); esters such as ethyl acetate, butyl acetate, and γ-butyrolactone; and ethers such as tetrahydrofuran (THF) and 1,4-dioxane. Among these, alcohols, glycols, and ketones are preferable. These organic solvents can be used singly or as a mixture of two or more of them as the dispersion medium.

The amount of the silica fine particle (f), when used in the curable composition of the present invention, is 5 to 80 parts by mass, preferably 5 to 70 parts by mass, and particularly preferably 5 to 60 parts by mass relative to 100 parts by mass of the siloxane oligomer containing at least one radically polymerizable double bond (a).

[(g) Active Energy Ray-Curable Multifunctional Monomer]

The curable composition of the present invention may further include an active energy ray-curable multifunctional monomer (g).

Examples of the active energy ray-curable multifunctional monomer (g) include urethane acrylate multifunctional monomers containing two or more (meth)acrylic groups, epoxy acrylate multifunctional monomers containing two or more (meth)acrylic groups, and various (meth)acrylic multifunctional monomers containing two or more (meth) acrylic groups.

At least one monomer selected from the group consisting of multifunctional (meth)acrylate compounds and multifunctional urethane (meth)acrylate compounds is preferable.

Examples of the active energy ray-curable multifunctional monomer include hexanediol di(meth)acrylate, neopentyl glycol di(meth)acrylate, triethylene glycol di(meth)acrylate, poly(ethylene glycol)di(meth)acrylate, poly(propylene glycol)di(meth)acrylate, pentaerythritol di(meth)acrylate monostearate, bisphenol A ethylene glycol adduct (meth) acrylate, bisphenol F ethylene glycol adduct (meth)acrylate, tricyclo[$5.2.1.0^{2,6}$]decanedimethanol di(meth)acrylate, tris-hydroxyethyl isocyanurate di(meth)acrylate, trimethylolpropane tri(meth)acrylate, trimethylolpropane ethylene glycol adduct tri(meth)acrylate, trimethylolpropane propylene glycol adduct tri(meth)acrylate, pentaerythritol tri(meth)acrylate, tris(meth)acryloyloxyethyl phosphate, trishydroxyethyl isocyanurate tri(meth)acrylate, modified ε-caprolactone tri (meth)acrylate, trimethylolpropane ethoxy tri(meth)acrylate, glycerin propylene glycol adduct tris(meth)acrylate, pentaerythritol tetra(meth)acrylate, pentaerythritol ethylene glycol adduct tetra(meth)acrylate, ditrimethylolpropane tetra(meth)acrylate, dipentaerythritol hexa(meth)acrylate, dipentaerythritol monohydroxy penta(meth)acrylate, urethane (meth)acrylate, epoxy(meth)acrylate, polyester (meth) acrylate, and unsaturated polyester.

[Solvent]

The curable composition of the present invention may further contain a solvent to be formed as varnish.

The solvent used herein may be any solvent that dissolves or disperses the (a) to (d) components and if desired the (e) to (g) components. Examples of the solvent include aromatic hydrocarbons such as toluene and xylene; esters or ester ethers such as ethyl acetate, butyl acetate, isobutyl acetate, γ-butyrolactone, methyl pyruvate, ethyl pyruvate, ethyl hydroxyacetate, ethyl lactate, butyl lactate, ethyl 2-hydroxy-2-methylpropionate, methyl 2-hydroxy-3-methylbutanoate, ethyl ethoxyacetate, methyl 3-methoxypropionate, ethyl 3-methoxypropionate, methyl 3-ethoxypropionate, ethyl 3-ethoxypropionate, methylcellosolve acetate, ethylcellosolve acetate, propylene glycol monomethyl ether acetate (PGMEA), and propylene glycol monopropyl ether acetate; ethers such as ethylene glycol monomethyl ether, ethylene glycol monoethyl ether, diethylene glycol monomethyl ether, diethylene glycol monoethyl ether, and propylene glycol monomethyl ether (PGME); ketones such methyl ethyl ketone (MEK), methyl isobutyl ketone (MIBK), cyclopentanone, and cyclohexanone; alcohols such as methanol, ethanol, n-propanol, isopropanol, n-butanol, isobutanol, sec-butanol, tert-butanol, and propylene glycol; and amides such as N,N-dimethylformamide (DMF), N,N-dimethylacetamide, and N-methyl-2-pyrrolidone (NMP). These solvents may be used singly or two or more of them may be used in combination. Alternatively, these solvents may be used as a mixed solvent with water.

A solid content concentration in the curable composition of the present invention is, for example, 0.5 to 80% by mass, 1 to 70% by mass, or 1 to 60% by mass. The solid content refers to a part obtained after removing a solvent component from all the components of the curable composition.

[Other Additives]

The curable composition of the present invention may appropriately contain additives that are generally added as needed so long as they do not impair the effects of the present invention. Examples of the additives include photosensitizers, polymerization inhibitors, polymerization initiators, leveling agents, surfactants, adhesion imparting agents, plasticizers, ultraviolet absorbers, antioxidants, storage stabilizers, antistatic agents, inorganic fillers, pigments, and dyes.

<Cured Film>

The curable composition of the present invention can be applied to a base material and then be subjected to photopolymerization (curing) to form a molded product such as a cured film and a laminate. A cured film thus obtained is also an object of the present invention.

Examples of the base material include plastics (polycarbonates, polymethacrylates, polystyrenes, polyesters, polyolefins, epoxy resins, melamine resins, triacetylcellulose, ABS (acrylonitrile-butadiene-styrene copolymers), AS (acrylonitrile-styrene copolymers), and norbornene resins, for example), metals, wood, paper, glass, silicon dioxide, and slate. The base material may be in the plate form, in the film form, or a three-dimensional molded article.

The method of application of the curable composition of the present invention can be selected, as appropriate, from cast coating, spin coating, blade coating, dip coating, roll coating, bar coating, die coating, spray coating, curtain coating, ink-jet printing, and printing methods (such as letterpress printing, intaglio printing, planography, and screen printing). Among these, spin coating is desirable because the application is completed for a short period of time so that a highly volatile solution is used and the curable composition is uniformly applied with ease. Roll coating, die coating, and spray coating are also desirable because these methods allow the curable composition to be applied easily and the smooth film to be formed uniformly on the surface of a large area. The curable composition suitably used herein can be a curable composition in the form of varnish as described above. Before application, the curable composition is preferably filtrated, for example, with a filter having a pore size of about 0.2 µm.

After application, pre-drying is preferably performed on a hot plate, in an oven, or the like, and then irradiation of an active energy ray such as ultraviolet rays is performed for photocuring. Examples of the active energy ray include ultraviolet light, an electron beam, and an X-ray. As a light source for the ultraviolet irradiation, sunlight, a chemical lamp, a low-pressure mercury lamp, a high-pressure mercury lamp, a metal halide lamp, a xenon lamp, or the like can be used.

Subsequently, post-baking, specifically heating on a hot plate, in an oven, or the like, can be performed to complete polymerization and polycondensation.

The thickness of the resulting film after dried and cured is usually 1 nm to 50 µm and is preferably 1 nm to 20 µm.

<Laminate Including Hard Coating Layer>

A laminate including a hard coating layer on at least part of the surface of a base material, which is obtained by applying the curable composition of the present invention to the base material to form a coating and irradiating the coating with an active energy ray such as ultraviolet rays for curing, is also an object of the present invention.

The base material, the coating method, and the irradiation of an energy ray such as ultraviolet rays used here are the same as the base material, the application method, and the ultraviolet irradiation described in the paragraph <Cured film> above.

The ultraviolet irradiation is preferably and desirably followed by an additional baking (post-baking) process. The baking process is performed under conditions selected as needed and is usually performed at 50 to 300° C. for 5 minutes to 72 hours.

The base material in the laminate is preferably glass.

The thickness of the hard coating layer of the laminate is preferably 1 nm to 50 m and is more preferably 1 nm to 20 µm.

The cured film and the hard coating layer formed from the curable composition of the present invention has excellent transparency, exhibits excellent adhesion to the substrate, and has anti-smudge properties such as properties to make sebum and fingerprints less visible, dirt wiping-off properties, and repellency to permanent marker ink.

Because of these properties, the cured film and the hard coating layer included in the laminate of the present invention are useful as a hard coating layer for use on the surface of various displays such as LCDs, PDPs, and touch panels.

In the present invention, the repellency to permanent marker ink refers to properties to repel the ink of the permanent marker into a bead form and therefore prevent the ink from readily adhering to the surface, after a permanent marker such as Magic Ink (registered trademark) (Teranishi Chemical Industry Co., Ltd.) or Mckie (registered trademark) (Zebra Co., Ltd.) is used to draw a line on the surface of a film.

EXAMPLES

The present invention will be described more specifically below with reference to examples. The present invention is not limited to the following examples. The apparatuses and conditions used in sample preparation and property analysis are as follows:

(1) $^{13}$C NMR Spectrum
  Apparatus: JNM-ECA700 manufactured by JEOL Datum, Ltd.
  Solvent: $CDCl_3$
  Standard: $CDCl_3$ (77.0 ppm)
(2) Gel Permeation Chromatography (GPC)
  Apparatus: HLC-8220GPC manufactured by Tosoh Corporation
  Column: Shodex (registered trademark) GPC KF-804L and GPC KF-805L manufactured by Showa Denko K.K.
  Column temperature: 40° C.
  Solvent: tetrahydrofuran
  Detector: RI
(3) Measurement of Glass Transition Temperature (Tg)
  Apparatus: Photo-DSC 204 F1 Phoenix (registered trademark) manufactured by NETZSCH
  Measurement conditions: in a nitrogen atmosphere
  Temperature raising rate: 5° C./minute (25 to 160° C.)
(4) Measurement of 5% Weight Loss Temperature ($Tds_{o5}$%)
  Apparatus: TG8120 manufactured by Rigaku Corporation
  Measurement conditions: in an air atmosphere
  Temperature raising rate: 10° C./minute (25 to 500° C.)
(5) Spin Coater
  Apparatus: MS-A100 manufactured by MIKASA CO., LTD.
(6) Hot Plate
  Apparatuses: MH-180CS and MH-3CS manufactured by As One Corporation
(7) UV Irradiator
  Apparatus: H02-L41 manufactured by EYE GRAPHICS CO., LTD.
(8) Measurement of Film Thickness
  Apparatus: EC-400 manufactured by J. A. Woollam
(9) Measurement of Coefficient of Dynamic Friction
  Apparatus: variable-load friction and wear tester TRIBOGEAR HHS2000 manufactured by Shinto Scientific Co., Ltd.
  Loading conditions: 50 g
  Probe: 0.6 mmR sapphire pin
  Measurement rate: 1 mm/second
(10) Haze Measurement
  Apparatus: NDH5000 manufactured by Nippon Denshoku Industries Co., Ltd.
(11) Measurement of Contact Angle
  Apparatus: DropMaster DM-501 manufactured by Kyowa Interface Science Co., Ltd.
  Measurement temperature: 20° C.
  Method for measurement: the contact angle formed five seconds after a test solvent adhered to the surface of a film was measured five times for one film. The average value was used as the contact angle value.

Abbreviations mean as follows:
IPDUA: difunctional urethane acrylate [EBECRYL (registered trademark) 4858 manufactured by Daicel-Cytec]
C6FA: 2-(perfluorohexyl)ethyl acrylate [R-1620 manufactured by Daikin Chemicals Sales Co., Ltd.)
MAIB: dimethyl 2,2'-azobisisobutyrate [MAIB manufactured by Otsuka Chemical Co., Ltd.]
MPTES: 3-methacryloyloxypropyltriethoxysilane [Shin-Etsu Silicone (registered trademark) KBE-503 manufactured by Shin-Etsu Chemical Co., Ltd.]
TEOS: tetraethoxysilane [TSL8124 manufactured by Momentive Performance Materials Japan LLC]
OTEOS: hydrolysis-condensation product of tetraethoxysilane (weight average molecular weight Mw: 1,700, degree of distribution: 1.4) [Ethyl Silicate 48 manufactured by Colcoat Co., Ltd.]
ST: isopropanol dispersed silica sol [IPA-ST-UP manufactured by Nissan Chemical Industries, Ltd., $SiO_2$: 15% by mass, particle diameter: 40 to 100 nm]
PFPE-1: perfluoropolyether having one end modified with an acrylic group [KY-1203 manufactured by Shin-Etsu Chemical Co., Ltd.]
PFPE-2: perfluoropolyether having both ends modified with acrylic groups [FLUOROLINK (registered trademark) AD1700 manufactured by Solvay Specialty Polymers]
PFPE-3: perfluoropolyether having both ends modified with methacrylic groups [FLUOROLINK (registered trademark) MD700 manufactured by Solvay Specialty Polymers]
HCl: 1 mol/L hydrochloric acid
TAG: thermal acid generator [San-aid (registered trademark) SI-60L manufactured by Sanshin Chemical Industry Co., Ltd.]
TMAC: 50%-by-mass aqueous solution of tetramethylammonium chloride [TMAC-50 manufactured by Lion Akzo Co., Ltd.]
I2959: 1-[4-(2-hydroxyethoxy)phenyl]-2-hydroxy-2-methyl-1-propan-1-one [Irgacure (registered trademark) 2959 manufactured by BASF Japan Ltd.]
MIBK: methyl isobutyl ketone
PGME: propylene glycol monomethyl ether
THF: tetrahydrofuran Synthesis Example 1

Production of Fluorine-Containing Highly Branched Polymer (F-HBP)

In a 300-mL reaction flask, 54 g of MIBK was placed, and nitrogen was flowed thereinto for 5 minutes with stirring, followed by heating (at about 116° C.) to reflux the content in the flask.

In another 100-mL reaction flask, 9.0 g (20 mmol) of IPDUA as a monomer A, 5.9 g (14 mmol) of C6FA as a monomer B, and 2.3 g (10 mmol) of MAIB as a polymerization initiator C and 54 g of MIBK were placed, and nitrogen was flowed thereinto for 5 minutes with stirring for nitrogen purge, followed by cooling in an ice bath to 0° C.

To the MIBK under reflux in the 300-mL reaction flask, the content of the 100-mL reaction flask containing IPDUA, C6FA, and MAIB was added dropwise with a dropping pump over 30 minutes. After the completion of the dropwise addition, stirring was continued for 1 hour.

Then, a rotary evaporator was used to distill 35 g of MIBK off from the reaction solution, and the resultant solution was transferred to 450 g of ice-cold hexane so that a polymer is precipitated. The resulting precipitate was separated through decantation. The resulting crude product was dissolved in 18 g of THF, followed by being transferred to 450 g of ice-cold hexane so that a polymer is reprecipitated. The resulting precipitate was separated through decantation. The resulting polymer was dissolved in 18 g of THF again, followed by distillation under reduced pressure and vacuum drying to obtain 12.0 g of a desired product (F-HBP) as a white powder (yield: 71%).

The $^{13}C$ NMR spectrum of the resulting product is shown in FIG. 1. The composition (molar ratio) of the unit structures of the F-HBP calculated from the $^{13}C$ NMR spectrum was IPDUA unit [A]:C6FA unit [B]:polymerization initiator unit [C]=50:30:20. The weight average molecular weight Mw of the resulting product measured by GPC in terms of polystyrene was 3,900, a degree of distribution Mw (weight average molecular weight)/Mn (number average molecular weight) of the product was 4.2, a glass transition temperature Tg of the product was 42.8° C., and a 5% weight loss temperature $Td_5$% of the product was 273.9° C.

Synthesis Example 2

Production of Siloxane Oligomer (Si-OLG-1)

In a 100-mL reaction flask, 11.6 g of MPTES and 7.4 g of ethanol were placed, followed by stirring for 5 minutes. To the resulting solution, a separately-prepared, mixed solution of 0.04 g of oxalic acid [manufactured by KANTO CHEMICAL CO., INC.], 3.2 g of water, and 7.4 g of ethanol was added dropwise over 30 minutes. After stirring for 5 minutes, the resulting solution was heated (at about 80° C.) to reflux the content in the reaction flask, followed by stirring for 1 hour. The reaction mixture was cooled to 30° C. to obtain a solution of Si-OLG-1 in ethanol.

The weight average molecular weight Mw of the Si-OLG-1 measured by GPC in terms of polystyrene was 1,200 and a degree of distribution Mw/Mn of the Si-OLG-1 was 1.1.

Synthesis Example 3

Production of Siloxane Oligomer (Si-OLG-2)

In a 100-mL reaction flask, 5.0 g of TEOS, 4.7 g of MPTES, and 6.4 g of ethanol were placed, followed by stirring for 5 minutes. To the resulting solution, a separately-prepared, mixed solution of 0.04 g of oxalic acid [manufactured by KANTO CHEMICAL CO., INC.], 3.2 g of water, and 6.4 g of ethanol was added dropwise over 30 minutes. After stirring for 5 minutes, the resulting solution was heated (at about 80° C.) to reflux the content in the reaction flask, followed by stirring for 1 hour. The reaction mixture was cooled to 30° C. to obtain a solution of Si-OLG-2 in ethanol.

The weight average molecular weight Mw of the Si-OLG-2 measured by GPC in terms of polystyrene was 1,300 and a degree of distribution Mw/Mn of the Si-OLG-2 was 1.1.

Synthesis Example 4

Production of Siloxane Oligomer (Si-OLG-3)

In a 100-mL reaction flask, 6.7 g of TEOS, 2.3 g of MPTES, and 6.1 g of ethanol were placed, followed by stirring for 5 minutes. To the resulting solution, a separately-prepared, mixed solution of 0.04 g of oxalic acid [manufactured by KANTO CHEMICAL CO., INC.], 3.2 g of water, and 6.1 g of ethanol was added dropwise over 30 minutes. After stirring for 5 minutes, the resulting solution was heated (at about 80° C.) to reflux the content in the reaction flask, followed by stirring for 1 hour. The reaction mixture was cooled to 30° C. to obtain a solution of Si-OLG-3 in ethanol.

The weight average molecular weight Mw of the Si-OLG-3 measured by GPC in terms of polystyrene was 1,100 and a degree of distribution Mw/Mn of the Si-OLG-3 was 1.1.

Example 1 to Example 8 and Comparative Example 1 to Comparative Example 2

Fabrication of Hard Coating Film and Evaluation (Thick Film)

[Fabrication of Hard Coating Film]

The following components were dissolved in a PGME/water mixed solvent (mass ratio: 95/5) to prepare a curable composition having a concentration of a solid content (all the components in the curable composition except for solvent components) of 30% by mass.
(1) Siloxane oligomer: Si-OLG-1 or Si-OLG-2 produced in Synthesis Example 2 or Synthesis Example 3 and OTEOS as specified in Table 1 in an amount specified in Table 1.
(2) Fluorine-containing highly branched polymer: F-HBP produced in Synthesis Example 1 in an amount specified in Table 1.
(3) Surface modifier: a mixture of PFPE-1/PFPE-2/PFPE-3 (mass ratio: 5/4/1) in an amount specified in Table 1.
(4) Acid catalyst: an acid catalyst specified in Table 1 in an amount of 1 part by mass. When HCl was used as an acid catalyst, 1 part by mass of TMAC (0.5 part by mass in terms of tetramethylammonium chloride) was further used.
(5) Photopolymerization initiator: 12959 in an amount specified in Table 1.

The resulting curable composition was stirred at room temperature (about 25° C.) for 30 minutes and was then applied to a glass substrate of 100×100 mm in size (1.1 mm thick) that had been cleaned by sonication in ethanol via spin coating (slope: 5 seconds, 2,000 rpm×30 seconds, slope: 5 seconds) to obtain a coating. The resulting coating was dried on a hot plate at 100° C. for 3 minutes. The coating was then irradiated with UV rays at 1,000 mJ/cm² in the atmosphere specified in Table 1 for photocuring, followed by post-baking in an atmospheric environment for 1 hour on a hot plate at a temperature specified in Table 1. The post-baking process was not conducted for examples with "N/A" indicated as its post-baking temperature in Table 1. Each of the resulting hard coating films had a thickness of about 1 μm.

[Evaluation of Hard Coating Film]

The resulting hard coating film was evaluated for adhesion to a substrate, the coefficient of dynamic friction, transparency, visibility of fingerprints, fingerprint wiping-off properties, repellency to permanent marker ink, and the water and oleic acid contact angles. The adhesion to a substrate, the transparency, the visibility of fingerprints, the fingerprint wiping-off properties, and the repellency to permanent marker ink were evaluated in the following manners. All the results are shown in Table 2.

Adhesion to substrate: a hard coating film was slit with a guide [Cross Cut Guide CCI-2 manufactured by Cotec] into a right-angled lattice pattern of 25 squares (5×5, each spaced by 2 mm), followed by evaluation by the cross cut method (in accordance with JIS 5600-5-6) with the use of a transparent tape of 12 mm wide [Cellophane Tape No. 29 manufactured by Nitto Denko Corporation] to calculate the number of squares remaining on the substrate among the 25 squares.

Transparency: the haze value of a hard coating film together with a glass substrate was measured for evaluation according to the following criteria.

Fingerprints visibility: on the surface of a hard coating film, the finger with nasal sebum adhering thereto was pressed down, and the fingerprint adhering to the hard coating film was visually observed for evaluation according to the following criteria.

Fingerprint wiping-off properties: the fingerprint adhering to the hard coating film by the method above was wiped off with a nonwoven fabric wiper [BEMCOT (registered trademark) M-1 manufactured by Asahi Kasei Fibers Corporation], and the wiping-off properties were evaluated according to the following criteria.

Repellency to permanent marker ink: a line was drawn on the surface of a hard coating film with a permanent marker [Fine of Mckee Double-sided Extra Fine/Fine (Black) manufactured by Zebra Co., Ltd.] and was visually observed for evaluation according to the following criteria.

[Evaluation Criteria for Transparency]
  A: haze value<0.5
  B: 0.5≤haze value<1.0
  C: haze value≥1.0

[Evaluation Criteria for Fingerprints Visibility]
  A: a fingerprint adhering to the film was not visible
  B: a fingerprint adhering to the film was slightly visible
  C: a fingerprint adhering to the film was considerably visible

[Evaluation Criteria for Fingerprint Wiping-Off Properties]
  A: wiped-off with no force applied
  B: wiped-off with a slight force applied
  C: wiped-off only with a large force applied

[Evaluation Criteria for Repellency to Permanent Marker Ink]
  A: a line was hardly drawn because permanent marker ink was repelled into a bead form
  B: a perfect line was not drawn with ink fading in places
  C: a line was successfully drawn

[Test on Durability of Hard Coating Film]

The hard coating film obtained in Example 1 to Example 8 and Comparative Example 1 was rubbed on its surface with wire wool (load applied: 250 g, 1,500 times of back-and-forth rubbing), followed by evaluation of repellency to permanent marker ink and water and oleic acid contact angles in the same manner as above. All the results are shown in Table 2.

TABLE 1

| | Siloxane oligomer | | F-HBP [part by mass] | Surface modifier [part by mass] | Acid catalyst 1 part by mass | I2959 [part by mass] | Photocuring atmosphere | Post bake temperature [° C.] |
|---|---|---|---|---|---|---|---|---|
| | Type | Addition amount [part by mass] | | | | | | |
| Example 1 | Si-OLG-1 | 100 | 0.01 | 1 | HCl | 8 | $N_2$ | Not performed |
| Example 2 | Si-OLG-2 | 100 | 0.01 | 1 | HCl | 8 | $N_2$ | Not performed |
| Example 3 | Si-OLG-2 | 100 | 0.01 | 1 | HCl | 8 | Air | 180 |
| Example 4 | Si-OLG-2 | 100 | 0.01 | 1 | HCl | 8 | Air | 100 |
| Example 5 | Si-OLG-2 | 100 | 0.01 | 1 | HCl | 3 | Air | 180 |
| Example 6 | Si-OLG-2 | 100 | 0.005 | 0.5 | HCl | 8 | Air | 180 |
| Example 7 | Si-OLG-2 | 100 | 0.005 | 0.5 | TAG | 8 | Air | 180 |
| Example 8 | Si-OLG-2 | 100 | 0.005 | 0.5 | None | 8 | Air | 180 |
| Comparative Example 1 | OTEOS | 100 | 0.01 | 1 | HCl | 8 | Air | 180 |
| Comparative Example 2 | Si-OLG-2 | 100 | None | None | HCl | 8 | Air | 180 |

TABLE 2

| | Initial | | | | | | | | After test on durability | | |
|---|---|---|---|---|---|---|---|---|---|---|---|
| | Adhesion | Coefficient of dynamic friction | Transparency | Visibility of fingerprints | Fingerprint wiping-off properties | Repellency to permanent marker ink | Contact angle [degree] | | Repellency to permanent marker ink | Contact angle [degree] | |
| | | | | | | | Water | Oleic acid | | Water | Oleic acid |
| Example 1 | 25/25 | 0.07 | A | A | A | A | 113 | 75 | A | 110 | 75 |
| Example 2 | 25/25 | 0.07 | A | A | A | A | 111 | 75 | A | 110 | 74 |
| Example 3 | 25/25 | 0.07 | A | A | A | A | 109 | 73 | A | 109 | 72 |
| Example 4 | 25/25 | 0.05 | A | A | A | A | 108 | 74 | B | 103 | 70 |
| Example 5 | 25/25 | 0.10 | A | A | A | A | 108 | 70 | B | 100 | 63 |
| Example 6 | 25/25 | 0.09 | A | A | A | A | 109 | 72 | A | 107 | 70 |
| Example 7 | 25/25 | 0.08 | A | A | A | A | 110 | 74 | A | 108 | 68 |
| Example 8 | 25/25 | 0.08 | A | A | A | A | 108 | 72 | A | 106 | 65 |
| Comparative Example 1 | 25/25 | 0.11 | C | B | B | A | 112 | 73 | C | 58 | 27 |
| Comparative Example 2 | 25/25 | 0.21 | A | C | C | C | 60 | 15 | | | |

As shown in Table 2, the hard coating film of Example 1 to Example 8 (thick film) exhibited sufficient adhesion to a glass substrate and had excellent transparency. The hard coating film of Example 1 to Example 8 also had anti-smudge properties such as properties to make sebum and fingerprints less visible, fingerprint wiping-off properties, and repellency to permanent marker ink and maintained sufficient repellency to permanent marker ink after the durability test.

In contrast, in the hard coating film of Comparative Example 1 (thick film) that contained, instead of the siloxane oligomer as the component (a) of the present invention, an alkoxysilane oligomer (OTEOS) containing no radically polymerizable double bond, transparency was insufficient, and its repellency to permanent marker ink and its contact angle significantly decreased after the durability test, which results in poor durability.

The hard coating film of Comparative Example 2 (thick film) in which the fluorine-containing highly branched polymer (b) (F-HBP) and the surface modifier (c) of the present invention were not added exhibited adhesion and transparency but was poor in anti-smudge properties such as properties to make sebum and fingerprints less visible, fingerprint wiping-off properties, and repellency to permanent marker ink.

Example 9 to Example 13 and Comparative Example 3

Fabrication and Evaluation of Hard Coating Film (Thin Film)

[Fabrication of Hard Coating Film]

The following components were dissolved in a PGME/water mixed solvent (mass ratio: 95/5) to prepare a curable composition having a concentration of a solid content (all the components in the curable composition except for solvent components) of 5% by mass.

(1) Siloxane oligomer: one of Si-OLG-1 to Si-OLG-3 produced in Synthesis Example 2 to Synthesis Example 4 and OTEOS as specified in Table 3 in an amount specified in Table 3.
(2) Silica fine particle: ST in an amount specified in Table 3.
(3) Fluorine-containing highly branched polymer: F-HBP produced in Synthesis Example 1 in an amount specified in Table 3.

(4) Surface modifier: a mixture of PFPE-1/PFPE-2/PFPE-3 (mass ratio: 5/4/1) in an amount specified in Table 3.
(5) Acid catalyst: 1 part by mass of HCl and 1 part by mass of TMAC (0.5 part by mass in terms of tetramethylammonium chloride).
(6) Photopolymerization initiator: 10 parts by mass of 12959.

The resulting curable composition was stirred at room temperature (about 25° C.) for 30 minutes and was then applied to a glass substrate of 100×100 mm in size (1.1 mm thick) that had been cleaned by sonication in ethanol via spin coating (slope: 5 seconds, 2,000 rpm×30 seconds, slope: 5 seconds) to obtain a coating. The resulting coating was dried on a hot plate at 60° C. for 3 minutes. The coating was then irradiated with UV light at 1,000 mJ/cm$^2$ in a nitrogen atmosphere for photocuring, followed by post-baking in an atmospheric environment on a hot plate at 180° C. for 1 hour. Each of the resulting hard coating films had a thickness of about 60 to 70 nm.

[Evaluation of Hard Coating Film]

The resulting hard coating film was evaluated for adhesion to a substrate, the coefficient of dynamic friction, transparency, visibility of fingerprints, fingerprint wiping-off properties, repellency to permanent marker ink, and the water and oleic acid contact angles in the same manner as above. All the results are shown in Table 4.

[Test on Durability of Hard Coating Film]

The hard coating film obtained in Example 9 to Example 13 and Comparative Example 3 was rubbed on its surface with wire wool (load applied: 250 g, 1,500 times of back-and-forth rubbing), followed by evaluation of transparency and repellency to permanent marker ink in the same manner as above. All the results are shown in Table 4.

As shown in Table 4, the hard coating film obtained in Example 9 to Example 13 (thin film), as in the cases of the hard coating films (thick films) of Example 1 to Example 8 above, exhibited sufficient adhesion to a glass substrate and had excellent transparency and anti-smudge properties such as properties to make sebum and fingerprints less visible, fingerprint wiping-off properties, and repellency to permanent marker ink. The hard coating film obtained in Example 9 to Example 13 also maintained adequate transparency and excellent repellency to permanent marker ink after the durability test.

In contrast, in the hard coating film of Comparative Example 3 (thin film) that contained, instead of the siloxane oligomer as the component (a) of the present invention, an alkoxysilane oligomer (OTEOS) containing no radically polymerizable double bond, transparency was insufficient and its repellency to permanent marker ink significantly decreased after the durability test, which results in poor durability.

The invention claimed is:

1. A curable composition comprising:
   (a) 100 parts by mass of a siloxane oligomer containing at least one radically polymerizable double bond,
   (b) 0.001 to 1 part by mass of a fluorine-containing highly branched polymer,
   (c) 0.01 to 40 parts by mass of a surface modifier containing a perfluoropolyether compound, and
   (d) 0.1 to 25 parts by mass of a polymerization initiator generating a radical upon active energy ray irradiation, wherein
   the fluorine-containing highly branched polymer (b) is a fluorine-containing highly branched polymer obtained by polymerization of a monomer A containing two or more radically polymerizable double bonds per mol-

TABLE 3

| | Siloxane oligomer | | Silica fine particle [part by mass] | F-HBP [part by mass] | Surface modifier [part by mass] | Acid catalyst 1 part by mass | I2959 [part by mass] | Photocuring atmosphere | Post bake temperature [° C.] |
|---|---|---|---|---|---|---|---|---|---|
| | Type | Addition amount [part by mass] | | | | | | | |
| Example 9 | Si-OLG-1 | 100 | None | 0.1 | 10 | HCl | 10 | N$_2$ | 180 |
| Example 10 | Si-OLG-2 | 100 | None | 0.1 | 10 | HCl | 10 | N$_2$ | 180 |
| Example 11 | Si-OLG-3 | 100 | None | 0.1 | 10 | HCl | 10 | N$_2$ | 180 |
| Example 12 | Si-OLG-2 | 75 | 19 | 0.06 | 6 | HCl | 10 | N$_2$ | 180 |
| Example 13 | Si-OLG-3 | 75 | 19 | 0.06 | 6 | HCl | 10 | N$_2$ | 180 |
| Comparative Example 3 | OTEOS | 100 | None | 0.1 | 10 | HCl | 10 | N$_2$ | 180 |

TABLE 4

| | Initial | | | | | | | | After test on durability | |
|---|---|---|---|---|---|---|---|---|---|---|
| | Adhesion | Coefficient of dynamic friction | Transparency | Visibility of fingerprints | Fingerprint wiping-off properties | Repellency to permanent marker ink | Contact angle [degree] | | Transparency | Repellency to permanent marker ink |
| | | | | | | | Water | Oleic acid | | |
| Example 9 | 25/25 | 0.07 | A | A | A | A | 109 | 74 | B | A |
| Example 10 | 25/25 | 0.09 | A | A | A | A | 109 | 71 | A | A |
| Example 11 | 25/25 | 0.09 | A | A | A | A | 108 | 73 | A | A |
| Example 12 | 25/25 | 0.08 | A | A | A | A | 110 | 72 | B | A |
| Example 13 | 25/25 | 0.16 | A | B | A | A | 102 | 64 | B | A |
| Comparative Example 3 | 25/25 | 0.08 | C | B | B | A | 108 | 73 | C | C | ecule and a monomer B containing a fluoroalkyl group and at least one radically polymerizable double bond per molecule in the presence of a polymerization initiator C in an amount of 5 to 200 mol % with respect to the number of moles of the monomer A.

2. The curable composition according to claim 1, wherein the siloxane oligomer containing at least one radically polymerizable double bond (a) is a siloxane oligomer obtained through hydrolysis-condensation of an alkoxysilane D of Formula [3]:

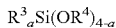  [3]

(where $R^3$ is a monovalent organic group containing a radically polymerizable double bond, $R^4$ is a methyl group or an ethyl group, and a is 1 or 2).

3. The curable composition according to claim 2, wherein $R^3$ is a monovalent organic group containing a vinyl group or a (meth)acrylic group.

4. The curable composition according to claim 3, wherein the alkoxysilane D is a compound of Formula [4]:

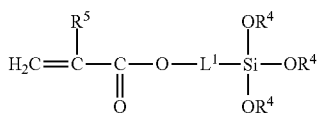  [4]

(where $R^4$ is the same as defined above for Formula [3], $R^5$ is a hydrogen atom or a methyl group, and $L^1$ is a $C_{1-6}$ alkylene group).

5. The curable composition according to claim 2, wherein the siloxane oligomer containing at least one radically polymerizable double bond (a) is a siloxane oligomer obtained through hydrolysis-condensation of the alkoxysilane D and an alkoxysilane E of Formula [5]:

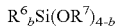  [5]

(where $R^6$ is a $C_{1-6}$ alkyl group that is optionally substituted with a fluorine atom or a phenyl group, $R^7$ is a methyl group or an ethyl group, and b is an integer of 0 to 2).

6. The curable composition according to claim 5, wherein the siloxane oligomer containing at least one radically polymerizable double bond (a) is a siloxane oligomer containing at least 10 mol % of the alkoxysilane D unit.

7. The curable composition according to claim 1, wherein the siloxane oligomer containing at least one radically polymerizable double bond (a) is a siloxane oligomer containing a structural unit of Formula [6] in an amount of at least 10 mol % of all the structural units:

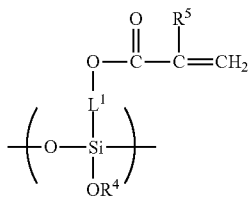  [6]

(where $L^1$ is a $C_{1-6}$ alkylene group, $R^4$ is a methyl group or an ethyl group, and $R^5$ is a hydrogen atom or a methyl group).

8. The curable composition according to claim 1, wherein the monomer A is a compound containing one or both of a vinyl group and a (meth)acrylic group.

9. The curable composition according to claim 8, wherein the monomer A is a divinyl compound or a di(meth)acrylate compound.

10. The curable composition according to claim 1, wherein the monomer B is a compound containing at least either a vinyl group or a (meth)acrylic group.

11. The curable composition according to claim 10, wherein the monomer B is a compound of Formula [1]:

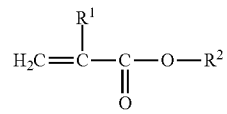  [1]

(where $R^1$ is a hydrogen atom or a methyl group and $R^2$ is a $C_{2-12}$ fluoroalkyl group that is optionally substituted with a hydroxy group).

12. The curable composition according to claim 11, wherein the monomer B is a compound of Formula [2]:

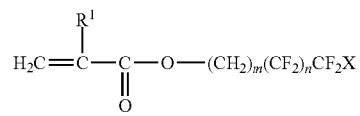  [2]

(where $R^1$ is the same as defined above for Formula [1], X is a hydrogen atom or a fluorine atom, m is 1 or 2, and n is an integer of 0 to 5).

13. The curable composition according to claim 1, wherein the polymerization initiator C is an azo polymerization initiator.

14. The curable composition according to claim 1, wherein the fluorine-containing highly branched polymer (b) is a highly branched polymer obtained by using the monomer B in an amount of 5 to 300 mol % with respect to the monomer A.

15. The curable composition according to claim 1, wherein the polymerization initiator generating a radical upon active energy ray irradiation (d) is an alkylphenone compound.

16. The curable composition according to claim 1, further comprising:
as a hydrolysis catalyst, (e) an acid or an acid generator in an amount of 0.0001 to 10 mol % with respect to the alkoxysilyl group of the siloxane oligomer containing at least one radically polymerizable double bond (a).

17. A cured film obtained from the curable composition as claimed in claim 1.

18. A laminate comprising:
a hard coating layer on at least part of a surface of a base material, wherein
the hard coating layer is obtained by applying the curable composition as claimed in claim 1 to the base material to form a coating and irradiating the coating with an active energy ray for curing.

19. The laminate according to claim 18, wherein the laminate is obtained by performing an additional baking process.

20. The laminate according to claim 18, wherein the base material is glass.

21. The laminate according to claim 18, wherein the hard coating layer has a thickness of 1 nm to 50 μm.

* * * * *